United States Patent
Urade et al.

(10) Patent No.: US 10,526,555 B2
(45) Date of Patent: Jan. 7, 2020

(54) CONVERSION OF BIOMASS INTO METHANE

(71) Applicant: SHELL OIL COMPANY, Houston, TX (US)

(72) Inventors: Vikrant Nanasaheb Urade, Bengaluru (IN); Laxmi Narasimhan Chilkoor Soundararajan, Bengaluru (IN); Madhusudhan Rao Panchagnula, Bengaluru (IN); Dhairya Dilip Mehta, Bengaluru (IN)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/762,374

(22) PCT Filed: Sep. 23, 2016

(86) PCT No.: PCT/EP2016/072763
§ 371 (c)(1),
(2) Date: Mar. 22, 2018

(87) PCT Pub. No.: WO2017/051008
PCT Pub. Date: Mar. 30, 2017

(65) Prior Publication Data
US 2018/0273864 A1    Sep. 27, 2018

(30) Foreign Application Priority Data
Sep. 25, 2015    (IN) .......................... 5136/CHE/2015

(51) Int. Cl.
C10L 3/08    (2006.01)
C10L 3/10    (2006.01)
(Continued)

(52) U.S. Cl.
CPC  C10L 3/08 (2013.01); C01B 3/34 (2013.01); C10B 53/02 (2013.01); C10B 57/06 (2013.01);
(Continued)

(58) Field of Classification Search
CPC ........ C10L 3/08; C10L 3/101; C10L 2290/06; C10L 2290/02; C10L 3/10;
(Continued)

(56) References Cited

U.S. PATENT DOCUMENTS 5,961,786 A    10/1999  Freel et al.
8,278,492 B2   10/2012  Myllyoja et al.
(Continued)

FOREIGN PATENT DOCUMENTS

CA    1283880 C    5/1991
EP    0998975 A1   5/2000
(Continued)

OTHER PUBLICATIONS

Frigon et al., "Biomethane production from starch and lignocellulosic crops: a comparative review", Biofuels, Bioproducts & Biorefining, vol. 4, Issue No. 4, 2010, pp. 447-458.
(Continued)

Primary Examiner — In Suk C Bullock
Assistant Examiner — Ali Z Fadhel

(57) ABSTRACT

A process for producing methane from a biomass, biomass-containing and/or biomass-derived feedstock is provided. The process comprises:
  a) providing in a hydropyrolysis reactor vessel a hydropyrolysis catalyst composition, said composition comprising one or more active metals supported on an oxide-based support, said one or more active metals comprising at least one of cobalt and nickel and said one or more active metals being present in total in an amount in the range of from 2 to 75 wt % based on the overall weight of the catalyst composition;
(Continued)

b) contacting the feedstock with said hydropyrolysis catalyst composition and molecular hydrogen in said hydropyrolysis reactor vessel, to produce a first product stream comprising char, catalyst fines and gases comprising hydrogen and hydrocarbons, of which hydrocarbons at least 70 wt % is methane and, optionally, CO and $CO_2$; and c) removing said char and catalyst fines from said first product stream.

20 Claims, 1 Drawing Sheet

(51) Int. Cl.
    *C01B 3/34*      (2006.01)
    *C10B 53/02*      (2006.01)
    *C10B 57/06*      (2006.01)

(52) U.S. Cl.
    CPC ...... *C10L 3/101* (2013.01); *C01B 2203/0205* (2013.01); *C10L 2290/02* (2013.01); *C10L 2290/06* (2013.01)

(58) Field of Classification Search
    CPC ........... C10L 2290/543; C10L 2290/54; C10B 57/06; C10B 53/02; C01B 3/34; C01B 2203/0205; B01J 23/755; B01J 23/75; C10G 1/086; Y02E 50/32; Y02E 50/14
    See application file for complete search history.

(56) References Cited

U.S. PATENT DOCUMENTS

| | | |
|---|---|---|
| 8,383,871 B1 | 2/2013 | Sellars et al. |
| 2002/0043483 A1 | 4/2002 | Leung et al. |
| 2004/0216891 A1 | 11/2004 | Maguire |
| 2008/0280754 A1 | 11/2008 | Toledo Antonio et al. |
| 2008/0308457 A1 | 12/2008 | Dindi et al. |
| 2009/0139732 A1 | 6/2009 | Garcia |
| 2010/0251615 A1 | 10/2010 | Marker et al. |
| 2011/0167713 A1 | 7/2011 | Quignard et al. |
| 2012/0232299 A1 | 9/2012 | Bartek et al. |
| 2012/0260563 A1 | 10/2012 | Marker et al. |
| 2012/0317873 A1 | 12/2012 | Johnson et al. |
| 2013/0172637 A1* | 7/2013 | Sellars ............... C10L 3/08 585/240 |
| 2013/0338412 A1 | 12/2013 | Marker et al. |
| 2014/0058182 A1 | 2/2014 | Sandstede et al. |
| 2014/0100395 A1* | 4/2014 | Felix ................. C10G 1/006 585/240 |
| 2015/0133704 A1* | 5/2015 | Del Paggio ........... C10K 1/024 585/242 |
| 2016/0145497 A1* | 5/2016 | Lattner .................. C07C 2/864 585/240 |

FOREIGN PATENT DOCUMENTS

| | | |
|---|---|---|
| EP | 1553157 A1 | 7/2005 |
| EP | 1717411 A1 | 11/2006 |
| WO | 8801611 A1 | 3/1988 |
| WO | 9856876 A1 | 12/1998 |
| WO | 0077129 A1 | 12/2000 |
| WO | 0118353 A1 | 3/2001 |
| WO | 2010117437 A1 | 10/2010 |
| WO | 2012104257 A1 | 8/2012 |
| WO | 2012162403 A1 | 11/2012 |
| WO | 2013054303 A1 | 4/2013 |
| WO | 2013064539 A1 | 5/2013 |
| WO | 2013066808 A1 | 5/2013 |
| WO | 2013068394 A1 | 5/2013 |
| WO | 2013074434 A1 | 5/2013 |
| WO | 2014001632 A1 | 1/2014 |
| WO | 2015114008 A1 | 8/2015 |

OTHER PUBLICATIONS

Van Der Meijden et al., "Large scale production of Bio-Methane from woody biomass", Energy Research Centre of the Netherlands Report No. ECN-M-11-098, Oct. 2011, 17 pages.

Bridgwater, "Biomass Fast Pyrolysis", Review paper BIBLID: 0354-9836, vol. 8, Issue No. 2, 2004, pp. 21-49.

International Search Report and Written Opinion received for PCT Patent Application No. PCT/EP2016/072763, dated Dec. 12, 2016, 12 pages.

International Search Report and Written Opinion received for PCT Patent Application No. PCT/EP2015/051709, dated May 8, 2015, 14 pages.

International Search Report and Written Opinion received for PCT Patent Application No. PCT/EP2015/064749, dated Aug. 20, 2015, 9 pages.

International Search Report and Written Opinion received for PCT Patent Application No. PCT/EP2015/064691, dated Aug. 20, 2015, 9 pages.

International Search Report and Written Opinion received for PCT Patent Application No. PCT/EP2015/064732, dated Aug. 20, 2015, 9 pages.

Marker et al., "Integrated Hydropyrolysis and Hydroconversion Process for Production of Gasoline and Diesel Fuel from Biomass", Extended Abstracts 2009 AICHE, 2009, 11 pages, XP002718084.

Vassilev et al., "Composition, Properties and Challenges of Algae Biomass for Biofuel Application: an Overview", Fuel, vol. 181, Apr. 28, 2016, pp. 1-33, XP029555565.

* cited by examiner

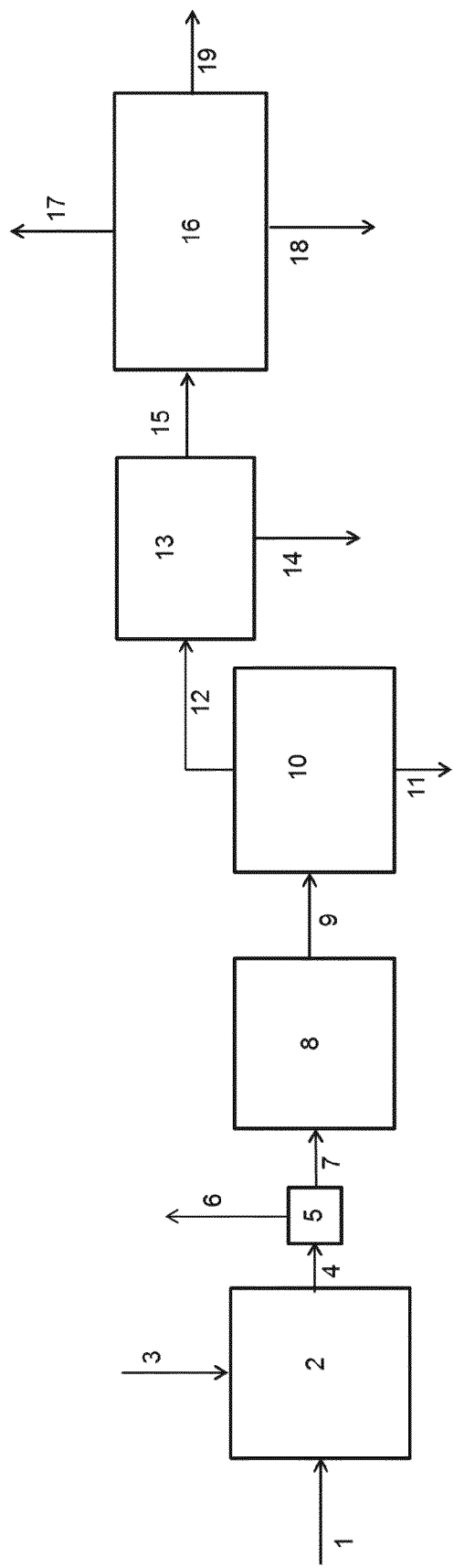

CONVERSION OF BIOMASS INTO METHANE

PRIORITY CLAIM

The present application is the National Stage (§ 371) of International Application No. PCT/EP2016/072763, filed 23 Sep. 2016, which claims priority from Indian Application No. 5136/CHE/2015, filed 25 Sep. 2015 incorporated herein by reference.

FIELD OF THE INVENTION

The invention relates to a process for converting biomass-based materials into methane.

BACKGROUND OF THE INVENTION

There is increasing demand for new technologies that decrease humanity's dependence on fossil fuels. With the challenges of finding and developing new reserves of gas and increasing constraints on carbon footprints, it is becoming more important to develop novel routes to obtain methane other than by extracting it from natural gas. An area of key interest is the use of biomass and solid refuse as a source of renewable carbon in the production of 'biogas' or 'biomethane'. The use of such carbon sources may allow for the production and use of methane with more sustainable $CO_2$ emissions when compared with natural gas.

Biomass-based feedstocks such as feedstocks containing lignocellulose (e.g. woody biomass, agricultural residues, forestry residues, residues from the wood products and pulp & paper industries) and municipal solid waste containing lignocellulosic material (e.g. old corrugated containers (OCC), waste paper, or food waste) are important feedstocks for non-fossil fuel derived sources of energy, due to their availability on a large scale. Lignocellulose comprises a mixture of lignin, cellulose and hemicelluloses in any proportion and usually also contains ash and moisture. Additionally, food waste contains starch, simple sugars, fats, oils and proteins.

Two main methods have been described in the art for the production of methane from biomass.

Firstly, biogas can be produced by anaerobic digestion of biodegradable materials with anaerobic microbes, which digest material inside a closed system. Anaerobic digestion methods typically require wet and easily digestible biomass as the feedstock to produce methane with high yields. The feedstock may be energy crops such as maize silage or biodegradable wastes including sewage sludge and food waste. The wet biomass used must be easy to digest to obtain high methane yields. That is, it must include relatively simple molecules such as sugars, starches, fats/oils and proteins. Conversion of hard, solid biomass such as woody biomass, agricultural residues, and lignocellulosic components of municipal solid waste, which are unfit for use as food or feed, to methane using the anaerobic digestion route is not practiced on a commercial scale. Literature reports, such as J-C Frigon and S. R. Guiot, Biofuels, Bioprod. Bioref. 2010, 4, 447-458, indicate that solid biomass feedstocks may be used but would require a pre-treatment before anaerobic digestion. The aim of such pre-treatment is to deconstruct the constituents of solid biomass and to convert cellulose/hemicellulose components into molecules that can be converted to methane by the microbial community by anaerobic processes. Some examples of suitable pretreatment are enzymatic hydrolysis, acid hydrolysis, solvent-based processes, steam explosion, ammonia recycle percolation, ammonia fiber explosion, lime treatment, and the OrganoSolv process. The lignocellulosic feedstock, after the pretreatment, is subjected to anaerobic microbial digestion and converted to a biogas. Biogas typically contains about 50-75 vol % methane, 25-50 vol % $CO_2$, 1-5 vol % water vapor, 0-5 vol % nitrogen, small amounts of $H_2S$ (0-0.5 vol %) and $NH_3$ (0-0.05 vol %), and trace amounts of $H_2$ and CO. Lignin is typically not deconstructed well and not converted to biogas with high yields by the microbial action. It is necessary to separate methane from biogas and pressurize it before using the biomethane produced by anaerobic digestion as a substitute for natural gas.

Gasification, such as described in 'Large scale production of biomethane from wood' Van der Meijden, C. M.; Rabou, L. P. L. M; van der Drift, A.; Vreugdenhil, B. J.; Smit, R.; October 2011, Energy Research Centre of the Netherlands Report Number ECN-M-11-098, is another method available to produce methane from hard, solid biomass. To produce methane from biomass by gasification, medium temperature (about 800 to 900° C.) gasification is generally employed. Medium temperature gasification of biomass produces a 'producer gas', which contains mainly light hydrocarbons ($CH_4$, $C_2H_4$) benzene, CO, $CO_2$, $H_2$, and water vapor, and contaminants such as dust (ash), tars, chlorides and sulfur compounds. Fluidized bed gasification processes produce gas which always contains some tar. Tar compounds are problematic for operation, as they condense into a high viscosity liquid as the gas is cooled. When the condensed tars combine with dust, the gas becomes very difficult to handle in the process equipment. Care must be taken to remove tars and dust from the process stream, and their removal often requires specialized process steps. Catalytic upgrading of tar- and dust-free producer gas into biomethane also requires deep removal of sulfur and chlorides, as these species are poisons for the methanation catalyst. Removal of sulfur and chlorine from producer gas is itself a multi-step process, with the final steps including the use of adsorbents such as ZnO for removal of sulfur down to ppb level. Finally, clean producer gas is sent to a pre-reformer, where larger hydrocarbons such as benzene are converted to a mixture of CO, $CH_4$, $CO_2$, $H_2O$ and $H_2$. Conversion of the higher hydrocarbons into the lighter products makes the removal of carbon dioxide and the compression of the gas for methanation easier. After $CO_2$ and $H_2O$ removal, the processed gas is converted into methane in the methanation section. The methanation is typically carried out in a fixed bed catalytic reactor using a nickel based catalyst. Gasification of biomass to produce synthetic natural gas is thus a multi-step process consisting of biomass gasification, tar separation, dust separation, separation of sulfur and chloride impurities, pre-reforming, $CO_2$ separation followed by methanation and separation of the methane for injection into a methane grid.

An efficient method for processing biomass into high quality liquid fuels is described in WO2010117437, in the name of Gas Technology Institute. This method is directed to the production of liquid fuels in the diesel, gasoline and/or jet fuels range. While not being limited to any particular catalyst, exemplary catalysts for use in such a process include sulfided CoMo or NiMo catalysts based on metal oxide supports. The process may create some C1-C3 gases, and, in order to produce hydrogen to satisfy at least some of the hydrogen requirements of the process, these gases may be separated and sent to a reforming section.

There remains a need for effective catalysts with activity for producing methane in high yields from biomass-based feedstocks, particularly solid biomass, and especially such catalysts for use in processes that do not create a conflict with food production for humans and/or animals.

SUMMARY OF THE INVENTION

Accordingly, the present invention provides a process for producing methane from a biomass, biomass-containing and/or biomass-derived feedstock, said process comprising the steps of:
a) providing in a hydropyrolysis reactor vessel a hydropyrolysis catalyst composition, said composition comprising one or more active metals supported on an oxide-based support, said one or more active metals comprising at least one of cobalt and nickel and said one or more active metals being present in total in an amount in the range of from 2 to 75 wt % based on the overall weight of the catalyst composition;
b) contacting the feedstock with said hydropyrolysis catalyst composition and molecular hydrogen in said hydropyrolysis reactor vessel at a temperature in the range of from 300 to 600° C. and a pressure in the range of from 0.50 to 7.50 MPa, to produce a first product stream comprising char, catalyst fines and gases comprising hydrogen and hydrocarbons, of which hydrocarbons at least 70 wt % is methane and, optionally, CO and $CO_2$; and
c) removing said char and catalyst fines from said first product stream.

BRIEF DESCRIPTION OF THE DRAWINGS

FIG. 1 shows a representation of one embodiment of the process of the invention.

DETAILED DESCRIPTION OF THE INVENTION

The present inventors have found that an efficient and high yielding process for the conversion of biomass, biomass-containing and/or biomass-derived feedstock to methane can be achieved by using a hydropyrolysis process in the presence of a hydropyrolysis catalyst composition comprising a supported metal catalyst containing in the range of from 2 to 75 wt % of active metals selected from nickel and/or cobalt.

The term 'active metals', as used herein, refers to metals that demonstrate catalytic activity as part of the catalyst composition, in the conversion of the feedstock, whether to the desired product or to other products, when the feedstock is contacted with said catalyst composition under the conditions set out herein. The term 'active metals', as used herein, does not include metals present in the catalyst composition as the oxide support.

In a preferred embodiment of the present invention, the one or more active metals consist essentially of cobalt and/or nickel.

The metals present in the hydropyrolysis catalyst composition used in the process of the present invention are supported on an oxide support. Oxide supports useful as supports for the hydropyrolysis catalyst composition include alumina, silica, titania, ceria, zirconia, as well as binary oxides such as silica-alumina, silica-titania and ceria-zirconia. Preferred supports include alumina, silica and titania. The most preferred support is alumina. The support may optionally contain recycled, regenerated and revitalized fines of spent hydrotreating catalysts or spent catalyst of this invention.

Total metal loadings of the active metals on the hydropyrolysis catalyst compositions are in the range of from 2 wt % to 75 wt %. Preferably, the active metal or metals are present in at least a total of 5 wt %. Also preferably, the active metal or metals are present in at most a total of 30 wt %, more preferably at most a total of 20 wt %. Weight percentages are expressed as a weight percentage of the total of all active metals in their reduced (metallic) form on the calcined catalyst.

Additional elements such as one or more of phosphorous and boron (which are not 'active metals' for purposes of this disclosure) may be incorporated into the catalyst, for example to improve the dispersion of the active metal.

The hydropyrolysis catalyst composition used in the process of the present invention may be prepared by any suitable method known in the art. Suitable methods include, but are not limited to co-precipitation of the active metals and the support from a solution; homogeneous deposition precipitation of the active metals on the support; pore volume impregnation of the support with a solution of the active metals; sequential and multiple pore volume impregnations of the support by a solution of the active metals, with a drying or calcination step carried out between successive pore volume impregnations; co-mulling of the support with a solution or a powder containing the active metals. Further, a combination of two or more of these methods may also be used.

The hydropyrolysis catalyst composition may be provided to the reactor in either an oxidic state or in a pre-reduced state.

Therefore, in one embodiment of the invention, after preparation by one of the above or another method, the compositions thus-formed are suitably calcined in the presence of air or oxygen in order to obtain the oxidic state. By the term 'oxidic state' as used herein is meant that 95% or more of the active metal atoms present are present in an oxidation state greater than zero as oxides. For example, a supported oxidic cobalt catalyst has more than 95% of the cobalt present in the +2 or +3 oxidation state, as oxides, and a supported oxidic nickel catalyst has more than 95% of the nickel present in the +2 oxidation state, as oxide.

In another embodiment of the invention, after preparation by one of the above or another method, the compositions thus-formed are suitably subjected to a reduction step in order to convert at least a portion of the active metals into their fully reduced state. This can be carried out by subjecting the catalyst to a reducing gas (for example, gas containing hydrogen) at elevated temperatures and elevated pressures. The temperatures of the reduction step can vary from 120° C. to 450° C. and pressures can vary from 0.1 megapascal to 10 megapascal.

It will be readily apparent that, although the hydropyrolysis catalyst composition provided in the hydropyrolysis reactor will initially comprise metal or metals in their oxidic or reduced states, the chemical form of the catalyst composition will undergo a change under the operating environment of the process, resulting in a change in the chemical form of the active metals on the catalyst and of the support as well. This change will involve phenomena resulting from the interaction of the catalyst with the reactant gas (hydrogen, carbon monoxide, carbon dioxide), products (hydrocarbons) and byproducts (water, carbon monoxide, carbon dioxide, ammonia, hydrogen sulfide et cetera) under the temperature and pressure conditions of the process.

It is postulated, without wishing to be bound by theory, that the initial chemical composition will be transformed under the conditions of the process of the invention into a composition where a portion of the active metals may be in reduced form (with an oxidation number of zero), another portion of the active metals may be in a higher oxidation state in sulfided form (forming a chemical bond with sulfur atoms present in the biomass feedstock) and yet another portion of the active metals may be in a higher oxidation state in oxidic form (with oxygen atoms available from the biomass feedstock or from the catalyst itself).

Further catalyst may be added to the process as it progresses in order to replace catalyst lost through attrition. Such catalyst will also be initially provided to the reactor with the active metals being present in their oxidic or pre-reduced state, depending on the state of the original catalyst composition.

Catalyst particles sizes, for use in a commercial reactor in the hydropyrolysis step, are preferably in the range of from 0.3 mm to 4.0 mm, more preferably in the range of from 0.6 mm to 3.0 mm, and most preferably in the range of from 1 mm to 2.4 mm.

In the inventive process, feedstock and molecular hydrogen are introduced into the hydropyrolysis reactor vessel containing the hydropyrolysis catalyst composition, in which vessel the biomass undergoes hydropyrolysis, producing a first product stream comprising char, catalyst fines and gases comprising hydrogen, optionally CO and $CO_2$ and hydrocarbons of which hydrocarbons at least 70 wt % are methane. Other gases typically present in the first product stream may include ethane, propane, water vapour, traces of heavier hydrocarbons (C4+) and oxygenated hydrocarbons. Other minor impurities such as $H_2S$ and ammonia may also be present in this stream. Preferably, of the hydrocarbons present in the first product stream, at least 80 wt %, more preferably at least 90 wt %, even more preferably at least 92 wt % are methane. Depending on the particular feedstock, the yield of methane in the first product stream, calculated based on the moisture and ash-free weight of feedstock, may be at least about 30 wt % (e.g., in the range from 30 wt % to 85 wt %), at least about 40 wt % (e.g., in the range from 40 wt % to 75 wt %), or at least about 50 wt % (e.g., in the range from 50 wt % to 70 wt %).

Although any type of reactor suitable for hydropyrolysis may be employed, the preferred type of reactor is a bubbling fluidized bed reactor. The fluidization velocity, catalyst size and bulk density and feedstock size and bulk density are chosen such that the catalyst remains in the bubbling fluidized bed, while the char produced gets entrained out of the reactor. The hydropyrolysis step employs a rapid heat up of the feedstock such that the residence time of the pyrolysis vapours in the reactor vessel is preferably less than about 1 minute, more preferably less than 30 seconds and most preferably less than 10 seconds.

The feedstock used in the inventive process contains any combination of biomass, biomass-containing and/or biomass-derived feedstock.

The term 'biomass' refers to substances derived from organisms living above the earth's surface or within the earth's oceans, rivers, and/or lakes. Representative biomass can include any plant material, or mixture of plant materials, such as a hardwood (e.g. whitewood), a softwood, a hardwood or softwood bark, lignin, algae, and/or lemna (sea weeds). Energy crops, or otherwise agricultural residues (e.g. logging residues) or other types of plant wastes or plant-derived wastes, may also be used as plant materials. Specific exemplary plant materials include corn fiber, corn stover, castor bean stalks, sugar cane bagasse, and sorghum, in addition to 'on-purpose' energy crops such as switchgrass, miscanthus, and algae. Short rotation forestry products, such as energy crops, include alder, ash, southern beech, birch, eucalyptus, poplar, willow, paper mulberry, Australian Blackwood, sycamore, and varieties of paulownia elongate. Other examples of suitable biomass include organic oxygenated compounds, such as carbohydrates (e.g. sugars), esters, alcohols, and ketones, as well as organic waste materials, such as waste paper, construction, demolition wastes, and biosludge.

Organic oxygenated compounds of particular interest include those contained in triglyceride-containing components, for example naturally occurring plant (e.g. vegetable) oils and animal fats, or mixtures of such oils and fats (e.g. waste restaurant oils or grease). Triglyceride-containing components, which are representative of particular types of biomass, typically comprise both free fatty acids and triglycerides, with the possible additional presence of monoglycerides and diglycerides. Triglyceride-containing components may also include those comprising derivative classes of compounds such as fatty acid alkyl esters (FAAE), which embrace fatty acid methyl esters (FAME) and fatty acid ethyl esters (FAEE).

Examples of plant oils include rapeseed (including canola) oil, corn oil, colza oil, crambe oil, sunflower oil, soybean oil, hempseed oil, olive oil, linseed oil, mustard oil, palm oil, peanut oil, castor oil, coconut oil, jatropha oil, camelina oil, cottonseed oil, salicornia oil, pennycress oil, algal oil and other nut oils, and mixtures thereof. Examples of animal fats include lard, offal, tallow, train oil, milk fat, fish oil, sewage sludge and/or recycled fats of the food industry, including various waste streams such as yellow and brown greases. Mixtures of one or more of these animal fats and one or more of these plant oils are also representative of particular types of biomass. The triglycerides and free fatty acids of a typical plant oil, animal fat, or mixture thereof, may include aliphatic hydrocarbon chains in their structures, with the majority of these chains having from about 8 to about 24 carbon atoms. Representative plant oils and/or animal fats, used as a triglyceride-containing component, may include significant proportions (e.g. at least about 30%, or at least about 50%) of aliphatic (e.g. paraffinic or olefinic) hydrocarbon chains with 16 and 18 carbon atoms. Triglyceride-containing components may be liquid or solid at room temperature. Representative triglyceride-containing components, including plant oils and animal fats, either in their crude form or pretreated, typically have a total oxygen content of about 10 to 12% by weight. Solid granulated algae that is optionally dried to a low moisture content may be a suitable type of biomass and in particular a triglyceride-containing component, in representative embodiments.

Low-quality and/or crude triglyceride-containing components, such as brown grease, are representative of biomass. Advantageously, such triglyceride-containing components may be introduced, according to specific embodiments, directly into the hydropyrolysis reactor without pretreatment, such that the reactor itself effectively performs the required transformations that allow the products of the hydropyrolysis of such low-quality and/or crude triglyceride-containing components, to be further processed in a later hydroconversion reactor in an effective manner. Representative triglyceride-containing components, for example, include those that have a total chloride or metals content, and in some cases a total alkali metal and alkaline earth metal content, of greater than about 10 ppm (e.g. from about 10 ppm to about 500 ppm), or greater than about 25 ppm (e.g. from about 25 ppm to about 250 ppm). Such levels of contaminant chloride or metals, and particularly alkali and alkaline earth metals, are detrimental to catalyst activity in many types of conventional hydroprocessing operations.

A biomass-containing feedstock may comprise all or substantially all biomass, but may also contain non-biological materials (e.g., materials derived from petroleum, such as plastics, or materials derived from minerals extracted from the earth, such as metals and metal oxides, including glass). An example of a "biomass-containing" feedstock that may comprise one or more non-biological materials is municipal solid waste (MSW).

Such municipal solid waste may comprise any combination of lignocellulosic material (yard trimmings, pressure-treated wood such as fence posts, plywood), discarded paper and cardboard, food waste, textile waste, along with refractories such as glass, metal. Prior to use in the process of this invention, municipal solid waste may be optionally converted, after removal of at least a portion of any refractories, such as glass or metal, into pellet or briquette form. Co-processing of MSW with lignocellulosic waste is also envisaged. Certain food waste may be combined with sawdust or other material and, optionally, pelletised prior to use in the process of the invention.

Another specific example of a biomass-containing feedstock comprises biomass, as described herein, in addition to one or more oxygenated polymers (e.g. plastics) that contain oxygen in the functional groups of their repeating monomeric substituents. The oxygen is at least partly removed in deoxygenation reactions occurring in the hydropyrolysis and/or hydroconversion reactors of processes described herein, through the production of $H_2O$, $CO$ and/or $CO_2$. The remainder of the polymeric structure may be used to generate either aliphatic or aromatic hydrocarbons in the substantially fully deoxygenated hydrocarbon product or liquid hydrocarbon fuel. Representative oxygenated plastics have an oxygen content of at least 10% by weight (e.g. in the range from about 10 to about 45% by weight), with specific examples of oxygenated plastic co-feeds being polycarbonates (e.g. $(C_{15}H_{16}O_2)_n$, approximately 14% by weight O), poly(methyl methacrylate) (PMMA, $(C_5H_8O_2)_n$, approx. 32% by weight O), polyethylene terephthalate (PET, $(C_{10}H_8O_4)_n$, approx. 33% by weight O) and polyamines (e.g. $(CONH_2)_n$, approx. 36% by weight O).

The term 'biomass-derived', for example when used in the phrase biomass-derived feedstock, refers to products resulting or obtained from the thermal and/or chemical transformation of biomass, as defined above, or biomass-containing feedstocks. Representative biomass-derived feedstocks therefore include, but are not limited to, products of pyrolysis (e.g. bio-oils), torrefaction (e.g. torrefied and optionally densified wood), hydrothermal liquefaction, hydrothermal carbonization (e.g. biomass that is pretreated and densified by acid hydrolysis in hot, compressed water) and polymerization (e.g. organic polymers derived from plant monomers). Other specific examples of biomass-derived products (e.g. for use as feedstocks) include black liquor, pure lignin, and lignin sulfonate.

Thermal and/or chemical transformation of biomass may occur in a pretreatment step prior to, or upstream of, the use of the resulting biomass-derived feedstock in processes described herein, including in a hydropyrolysis or hydroconversion step. Representative pretreating steps may use a pretreating reactor (pre-reactor), upstream of a hydropyrolysis reactor and involve devolatilisation and/or at least some hydropyrolysis of a biomass-containing feedstock. Such devolatilisation and optional hydropyrolysis may be accompanied by other, beneficial transformations, for example to reduce corrosive species content, reduce hydropyrolysis catalyst poison content (e.g. reduce sodium), and/or a reduce hydroconversion catalyst poison content. Pretreatment in a pre-reactor may be carried out in the presence of a suitable solid bed material, for example a pretreating catalyst, a sorbent, a heat transfer medium, and mixtures thereof, to aid in effecting such supplemental transformations and thereby improve the quality of the biomass-derived feedstock. Suitable solid bed materials include those having dual or multiple functions. In the case of a pretreating catalyst, those having activity for hydroprocessing of the biomass, described herein, are representative. Certain pretreated feedstocks, for example resulting or obtained from devolatilisation and/or at least some hydropyrolysis, are also biomass-derived feedstocks, whereas other pretreated feedstocks, for example resulting or obtained from classification without thermal or chemical transformation, are biomass-containing feedstocks, but not biomass-derived feedstocks.

Other types of crude or low-quality biomass or biomass-derived feedstocks, for example particular triglyceride-containing components such as brown grease, may be pretreated. Brown grease includes solid particulates such as rotten food particles. Crude triglyceride-containing components may otherwise include phospholipids (gums) and metal contaminants, including alkali and alkaline earth metals. Due to a high solids content, high hydroconversion catalyst poison content, and/or propensity to cause hydroconversion catalyst plugging, low-quality and/or crude triglyceride-containing components may be suitably upgraded by pretreatment to reduce the content of solids or other of these undesirable materials. A pretreated triglyceride-containing component represents a particular type of biomass-derived feedstock.

Biomass-derived feedstocks also extend to pretreated feedstocks that result or are obtained from thermal and/or chemical transformation, prior to, or upstream of, their use as feedstocks for processes described herein. Particular biomass-derived feedstocks are conventional pyrolysis oils, i.e. products of conventional pyrolysis processes, including fast pyrolysis processes as described in U.S. Pat. No. 5,961,786, CA1283880 and by Bridgwater, A. V., 'Biomass Fast Pyrolysis' Review paper BIBLID: 0354-9836, 8 (2004), 2, 21-49). Representative biomass-derived feedstocks in which the original lignocellulosic components have been transformed may comprise a significant quantity, for example generally from about 5% to about 85%, and often from about 10% to about 75%, by weight of cyclic compounds, including cyclic organic oxygenates. The term "cyclic organic oxygenates" is meant to include compounds in which oxygen is incorporated into a ring structure (e.g., a pyran ring), as well as compounds (e.g., phenol) having a ring structure with oxygen being incorporated outside the ring structure. In either case, the ring structure may have from 3 to 8 ring members, be fused to other ring structures, and may be completely saturated (e.g., naphthenic), completely unsaturated (e.g., aromatic), or partially unsaturated. These cyclic compounds are preferably obtained from natural sources, such as lignocellulosic biomass, as described above, that has been pyrolyzed to depolymerize and fragment the cyclic building blocks of cellulose, hemicellulose, and lignin.

A representative biomass-derived feedstock is therefore conventional pyrolysis oil (bio-oil), containing significant quantities of cyclic compounds (e.g., generally from about 10% to about 90% by weight, and typically from about 20% to about 80% by weight), as described above, that are precursors, in processes described herein, to aromatic hydrocarbons. Pyrolysis oil contains often from about 30% to about 40%, by weight of total oxygen, for example in the form of both (i) organic oxygenates, such as hydroxyaldehydes, hydroxyketones, sugars, carboxylic acids, and phenolic oligomers, and (ii) dissolved water. For this reason, although a pourable and transportable liquid fuel, pyrolysis oil (and particularly raw pyrolysis oil that has not been pretreated) has only about 55-60% of the energy content of crude oil-based fuel oils. Representative values of the energy content are in the range from about 19.0 MJ/liter (69,800 BTU/gal) to about 25.0 MJ/liter (91,800 BTU/gal). Moreover, this raw product is often corrosive and exhibits chemical instability due to the presence of highly unsaturated compounds such as olefins (including diolefins) and alkenylaromatics. In processes as described herein, pyrolysis oil may be further deoxygenated and undergo other transformations to yield methane as the predominant product.

Further specific examples of biomass-derived feedstocks include byproducts of Kraft or sulfate processing for the conversion of wood into pulp. These byproducts include black liquor, tall oil, pure lignin, and lignin sulfonate. Tall oil refers to a resinous yellow-black oily liquid, which is namely an acidified byproduct of pine wood processing. Tall oil, prior to refining, is normally a mixture of rosin acids, fatty acids, sterols, high-molecular weight alcohols, and other alkyl chain materials. Distillation of crude tall oil may be used to recover a tall oil fraction (depitched tall oil) that is enriched in the rosin acids, for use as a biomass-derived feedstock.

Naturally derived (e.g. non-fossil derived) oils rich in cyclic compounds, and therefore useful as biomass-derived feedstocks, including pyrolysis oil, and Kraft or sulfate processing byproducts (e.g. black liquor, crude tall oil, and depitched tall oil) as described herein, have a high oxygenate content that is detrimental to their value for use as biofuels, without deoxygenation. In the case of tall oil, for example, rosin acids (all multi-ring organic acids) are present in significant concentrations. Deoxygenation of these oxygenated cyclic compounds under hydropyrolysis and/or hydroconversion conditions of this invention beneficially yields methane.

Yet further examples of biomass-derived feedstocks include oils obtained from aromatic foliage such as eucalyptols, as well as solid granulated lignin that is optionally dried to a low moisture content. These examples can also ultimately lead to the formation of methane.

Representative biomass-derived feedstocks may be pretreated to improve quality, prior to introduction into processes as described herein. Tall oil, for example, may be used either in its crude form or may otherwise be pretreated by distillation (e.g. vacuum distillation) to remove pitch (i.e. providing depitched tall oil) and/or concentrate the rosin acids, which are primarily abietic acid and dehydroabietic acid but include other cyclic carboxylic acids. A biomass-derived feedstock may in general be obtained by a pretreatment involving separation to remove unwanted materials, for example from a crude tall oil or a crude pyrolysis oil (bio-oil). In the case of crude bio-oil, for example, pretreatment by filtration and/or ion exchange may be used to remove solids and/or soluble metals, prior to introduction of the pretreated bio-oil to a process as described herein. According to other embodiments, biomass-derived feedstocks in a crude or low-quality form, such as crude bio-oil or black liquor, may also be advantageously introduced directly into processes as described herein without such pretreatment steps, such that one or more process steps (e.g. hydropyrolysis and/or hydroconversion) may itself perform the necessary pretreatment and/or desired further transformations to ultimately yield methane. In the case of a hydropyrolysis reactor performing a pretreatment step, the partially deoxygenated hydropyrolysis product, including products of the hydropyrolysis of a crude or low-quality biomass-derived feedstock, can be further processed in a hydroconversion step in an effective manner yielding methane as the main product.

Any of the types of biomass-containing and biomass-derived feedstocks described herein may be combined and introduced to processes as described herein, or otherwise introduced separately, for example at differing axial positions into the hydropyrolysis and/or hydroconversion reactor. Different types of biomass-containing and/or biomass-derived feedstocks may be introduced into either the hydropyrolysis reactor or the hydroconversion reactor, although, according to particular embodiments described above, the introduction into one of these reactors (e.g., in the case of a crude or low-quality biomass-derived feedstock being introduced into the hydropyrolysis reactor vessel) may be preferable.

The feedstock utilised in the process of this invention may be in the form of loose biomass particles having a majority of particles preferably less than about 3.5 mm in size or in the form of a biomass/liquid slurry. However, it will be appreciated by those skilled in the art that the feedstock may be pre-treated or otherwise processed in a manner such that larger particle sizes may be accommodated. Suitable means for introducing the feedstock into the hydropyrolysis reactor vessel include, but are not limited to, an auger, fast-moving (greater than about 5 m/sec) stream of carrier gas (such as inert gases and $H_2$), and constant-displacement pumps, impellers, or turbine pumps. In the most preferred embodiment of the invention, a double-screw system comprising of a slow screw for metering the biomass followed by a fast screw to push the biomass into the reactor without causing torrefaction in the screw housing is used for biomass dosing. An inert gas or hydrogen flow is maintained over the fast screw to further reduce the residence time of the biomass in the fast screw housing.

The hydropyrolysis is carried out in the hydropyrolysis reactor vessel at a temperature in the range of from 300° C. to 600° C. and a pressure in the range of from 0.50 MPa to 7.50 MPa. The heating rate of the biomass is preferably greater than about 100 W/m². The weight hourly space velocity (WHSV) in g(biomass)/g(catalyst)/hr for this step is suitably in the range of from 0.2 $h^{-1}$ to 10 $h^{-1}$, preferably in the range of from 0.3 $h^{-1}$ to 3 $h^{-1}$.

The hydropyrolysis step of this invention operates at a temperature hotter than is typical of a conventional hydroprocessing processes familiar to those skilled in the state-of-the-art of hydrotreating and hydrocracking of petroleum-derived fractions, as a result of which the biomass is rapidly devolatilized. Thus, the step includes the use of an active catalyst to stabilize the hydropyrolysis vapours, but not so active that it rapidly cokes.

After the hydropyrolysis step, char and catalyst fines are removed from the first product stream. Any ash present will also be removed at this stage. The most preferred method of char and catalyst fines removal from the vapour stream is by cyclone separation.

Char may also be removed in accordance with the process of this invention by filtration from the vapour stream, or by way of filtering from a wash step-ebullated bed. Back-pulsing may be employed in removing char from filters, as long as the hydrogen used in the process of this invention sufficiently reduces the reactivity of the pyrolysis vapours and renders the char produced free-flowing. Electrostatic precipitation, inertial separation, magnetic separation, or a combination of these technologies may also be used to remove char and catalyst fines from the hot vapour stream before further hydrofinishing, cooling and condensation of the liquid product.

In accordance with one embodiment of this invention, cyclone separation followed by hot gas filtration to remove fines not removed in the cyclones may be used to remove the char. In this case, because the hydrogen has stabilized the free radicals and saturated the olefins, the dust cake caught on the filters is more easily cleaned than char removed in the hot filtration of the aerosols produced in conventional fast pyrolysis. In accordance with another embodiment of this invention, the char and catalyst fines are removed by bubbling first stage product gas through a re-circulating liquid. The re-circulated liquid used is a fully saturated (hydrogenated), stabilized oil having a boiling point typically above 370° C. Char or catalyst fines from the first reaction stage are captured in this liquid. A portion of the liquid may be filtered to remove the fines and a portion may be re-circulated back to the first stage hydropyrolysis reactor. One advantage of using a re-circulating liquid is that it provides a way to lower the temperature of the char-laden process vapours from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, cyclone separation followed by trapping the char and catalyst fines in a high-porosity solid adsorbent bed is used to remove the char and catalyst fines from the vapour stream. Examples of high-porosity solid adsorbents suitable for trapping char and catalyst fines include CatTrap® materials available from Crystaphase.

Inert graded bed materials may also be used to remove the char and catalyst fines from the vapour stream.

Any ash and catalyst fines present may also be removed in the char removal step.

After removal of the char, the first product stream from the hydropyrolysis reactor vessel may, optionally, be introduced into a hydroconversion reactor vessel and subjected to a hydroconversion step in the presence of a hydroconversion catalyst composition to produce a second product stream. If such a step is carried out, the hydroconversion is suitably carried out at a temperature in the range of from 300° C. to 600° C. and a pressure in the range of from 0.50 MPa t0 7.50 MPa. The weight hourly space velocity (WHSV) for this step is in the range of about 0.1 $h^{-1}$ to about 2 $h^{-1}$.

The hydroconversion catalyst composition used in this optional step may be protected from Na, K, Ca, P, S, Cl and other elements present in the biomass which may otherwise poison the catalyst, since these metals are predominantly removed from the biomass into char and ash in the hydropyrolysis stage. This catalyst is protected from olefins and free radicals by the upgrading achieved in the first reaction stage step.

Any hydroconversion catalyst composition suitable for use in the temperature range of this process may be employed in the hydroconversion step.

In one embodiment of the invention, the hydroconversion catalyst composition comprises the same catalyst composition as used as the hydropyrolysis catalyst composition. That is, a composition comprising one or more active metals supported on an oxide-based support, said one or more active metals comprising cobalt and/or nickel and said one or more active metals being present in total in an amount in the range of from 2 to 30 wt % based on the overall weight of the catalyst composition.

In another embodiment of the invention, the hydroconversion catalyst composition is selected from sulfided catalysts comprising one or more metals from the group consisting of nickel, cobalt, molybdenum or tungsten supported on a metal oxide. Suitable metal combinations include sulfided NiMo, sulfided CoMo, sulfided NiW, sulfided CoW and sulfided ternary metal systems comprising any three metals from the family consisting of Ni, Co, Mo and W. Catalysts such as sulfided Mo, sulfided Ni and sulfided W are suitable for use as well.

Other suitable catalysts for use as the hydroconversion catalyst composition include those described in in co-pending applications PCT/EP2015/051709, IN 3235/CHE/2014, IN 3236/CHE/2014 and IN 3238/CHE/2014.

Oxides useful as supports for the hydroconversion catalyst composition include alumina, silica, titania, ceria, zirconia, as well as binary oxides such as silica-alumina, silica-titania and ceria-zirconia. Preferred supports include alumina, silica and titania. The most preferred support is alumina.

Additional elements such as phosphorous may be incorporated into the catalyst to improve the dispersion of the metal. Metals can be introduced on the support by impregnation or co-mulling or a combination of both techniques.

Total metal loadings on the hydroconversion catalyst are preferably in the range of from 1 wt % to 75 wt % for base metals (e.g. cobalt, molybdenum, nickel, tungsten and iron) (weight percentages are expressed as a weight percentage of total of all active metals in their reduced (metallic) form on the calcined catalyst).

Catalyst particles sizes, for use in a commercial reactor in the hydroconversion step, are preferably in the range of from 0.3 mm to 4.0 mm, more preferably in the range of from 0.6 mm to 3.0 mm. Preferably, the hydroconversion catalyst is used in an extruded form, for example cylindrical or as trilobes.

After recovery of a gaseous product stream, either after removal of char and catalyst fines or after the hydroconversion step, if used, said gaseous product stream may be subjected to a cooling and condensation step for the removal of water produced as a by-product of the process, and of any C4+ hydrocarbons.

A portion of the gaseous process streams may be sent to a separation, reforming and water-gas shift section of the process, wherein hydrogen is produced from the light gases and may be re-used in the process. Preferably, this process provides enough hydrogen for use in the entire process of the invention. Renewable $CO_2$ is discharged as a by-product of the process. Prior to this section of the process, the gaseous process streams may be sent to a gas clean-up system to remove $H_2S$, ammonia and trace amounts of organic sulfur-containing compounds, if present as byproducts of the process.

Benefits of the present invention over the production of biomethane by gasification include the ability of the catalyst to withstand sulfur and chlorides, which are typical poisons for methanation catalysts. Sulfur and chloride are removed along with the char and don't impact the catalyst. Continuous replenishment of the hydropyrolysis catalyst composition can also allow for achieving a steady state activity for the methanation reaction.

The process of the present invention produces no tar and only a small amount of C4s and gasoline range hydrocarbons are produced. There are essentially no diesel-range hydrocarbons, or heavier hydrocarbons. No oxygenates are produced which are typical constituents or tars or gums.

Further, no fine dust is produced due to the size of catalyst and biomass and the use of bubbling rather than entrained fluidized bed reactor. The dust produced can be easily separated using cyclones and solid absorbents such as Cat-Trap technology.

In view of the product yields afforded by exemplary processes described herein, the separation of the desired methane is simplified. Advantageously, the selectivity towards methane is very high, and little or no $N_2$ is present. In preferred embodiments, no CO or $CO_2$ is present either, such that $CH_4$ only needs to be separated from water (a trivial process, which can be done by a simple cooling) and $H_2$. These steps may be carried out by simple and well-established technologies, such as cooling for removal of water and pressure swing absorption or membrane technology for the removal of hydrogen.

A much lower number of process steps is required than when using the gasification route.

Benefits of the present invention over an anaerobic digestion process for the production of biomethane include the ability of the inventive process to process a variety of feedstocks including hard, woody biomass, agricultural residues and components of municipal solid waste. The inventive process also converts lignin to methane. Further, a compact reactor may be used and the inventive process allows the conversion of biomass to methane with very short residence times.

DETAILED DESCRIPTION OF THE DRAWINGS

FIG. 1 shows an exemplary, but non-limiting, embodiment of the present invention.

Biomass, biomass-containing and/or biomass-derived feedstock 1 is contacted with a hydrogen-containing gaseous stream 3 in the presence of a hydropyrolysis catalyst composition in hydropyrolysis reactor vessel 2. The product stream 4 ('first product stream') of this reactor comprises gases including hydrogen and hydrocarbons, with at least 70 wt % of the hydrocarbons being methane. Char, ash and catalyst fines are entrained with the vapour phase product. A solid separator 5 separates char, ash and catalyst fines 6 from the vapour phase product 7. The vapour phase product 7 then may enter the optional catalytic hydroconversion reactor 8. This reactor is a fixed bed reactor. The product stream 9 of this reactor ('second product stream') comprises methane, hydrogen, water, other light gaseous hydrocarbons (e.g. ethane and propane), traces of $C_{4+}$ hydrocarbons, $H_2S$ and $NH_3$. The second product stream 9 is cooled in condenser 10, allowing separation of liquid water and $C_{4+}$ hydrocarbons 11. The remaining gaseous stream 12, is treated in treatment device 13 to remove $H_2S$ and $NH_3$ rich stream(s) 14. The methane-rich stream 15 is then sent for gas separation, reforming and water/gas shift reaction 16. An exemplary process involves the separation of hydrogen, for example by pressure-swing absorption. Said hydrogen will form part of hydrogen stream 17, which can be recycled to stream 3. A portion of the hydrogen-lean stream may then be subjected to steam reforming and water/gas shift to produce the remainder of hydrogen required for the overall process. A $CO_2$ stream 18 will be separated from the hydrogen formed in such a process. The remainder of the methane is then produced as high-purity methane stream 19.

An advantage of the inventive process is that the entire process may be operated at a suitable pressure, and with suitable pipeline quality, such that the methane is produced at a suitable pressure for direct injection into the methane grid. This reduces the overall compression duty required by the process, with compression only being required to compensate for pressure drop within the process.

The following non-limiting Example also serves to illustrate the invention.

Example 1

The hydropyrolysis reactor system used to convert woody biomass to biomethane comprised of a first stage hydropyrolysis reactor and a second stage hydroconversion reactor. The hydropyrolysis reactor was a bubbling fluidized bed reactor containing a powdered catalyst. Preheated hydrogen gas was used as the fluidizing medium. The woody biomass to be processed was dosed into the hydropyrolysis reactor using a double-screw dosing system containing a slow metering screw and a fast conveying screw. The woody biomass underwent fast hydropyrolysis in the first stage reactor, followed by catalytic conversion of the products of fast pyrolysis. Solid biochar was produced as the by-product of the process.

The biochar, along with small amount of attrited catalyst fines and products of hydropyrolysis, were entrained with the fluidizing medium and carried out of the hydropyrolysis reactor. The biochar was removed from the process stream using a sintered stainless steel filter. The solids-free process stream was introduced into the second stage reactor, which is a fixed bed hydroconversion reactor. The hydroconversion reactor carries out complete heteroatom removal reactions (removal of residual oxygen, sulfur and nitrogen) and saturation of olefins. The product of the hydroconversion reactor comprises of light hydrocarbon gases (C1-C3 hydrocarbon gases), water vapor, CO, $CO_2$, and a small amount of C4+ hydrocarbons.

A catalyst containing 10 wt % cobalt on an alumina support (expressed as weight percent of fully reduced cobalt on the $Co/Al_2O_3$ catalyst) was used as the hydropyrolysis catalyst. Prior to loading in the reactor, the catalyst was calcined at a temperature of approximately 400° C. in air. The calcination step ensures the cobalt on the catalyst is in oxidic form prior to use. The catalyst was ground and sieved to a particle size of 0.3 mm to 0.5 mm. About 200 g of the crushed and sieved catalyst was loaded in the hydropyrolysis reactor.

S-4232 catalyst (a cobalt/molybdenum catalyst with alumina support commercially available from CRI Catalyst Co), in the form of extrudates of 1.3 mm diameter and approximately 3 mm to 6 mm length, was used as the $2^{nd}$ upgrading catalyst in the second, fixed bed reactor. About 750 g of this catalyst was used in the hydroconversion reactor. The catalyst used was spent catalyst from previous runs.

The solid feedstock used was sawdust of Pinus sylvestris ground and sieved to a particle size of 500 μm and smaller. The catalyst in the $1^{st}$ bubbling fluidized reactor was fluidized with a stream of hydrogen preheated to a temperature of approximately 435° C. After the $1^{st}$ stage catalyst had been fluidized, the biomass was introduced into the reactor and processed in a continuous manner. The rate of processing of biomass was gradually ramped up to the target rate of 3.8 g/min, corresponding to a weight hourly space velocity of the biomass feedstock to the $1^{st}$ stage reactor of approximately 1.11 kg biomass per kg catalyst per hour. The weighted average temperature of the fluidized bed of catalyst was 454° C. over the duration of biomass processing. The biomass feedstock was converted to a mixture of char, ash and vapors in the 1st stage. The fluidization velocity was adjusted in such a way that the solid products (char, ash) and the vapor phase products were carried out of the reactor, while the catalyst remained in the reactor. Some catalyst was attrited into fines, and the fines were carried out of the bed as well.

The solid product was separated from the vapor phase product in a filter and the vapors were sent to the 2nd stage, fixed bed reactor. The average temperature of the 2nd stage catalyst was maintained at 403° C. The biomass feedstock rate was gradually ramped up to the final WHSV to the 2nd stage of 0.30 kg biomass per kg catalyst per hour. Operating pressure for both 1st and 2nd stage was 2.21 MPa (gauge).

The vapor phase product of the 2nd stage reactor was cooled in stages to −44° C. The liquid product collected included only an aqueous phase, and no liquid hydrocarbon was noticed in the liquid product. The off gas from the process was sent to an online GC, and composition of the gas was analyzed throughout the run. The mass balance and carbon balance of the process was calculated from the mass and analysis of the liquid products and compositional information of the gas product, based on which the yield profile was calculated.

It was found that the aqueous product contained negligible amount carbon (below 0.01 wt %). Incomplete hydrodeoxygenation of the feedstock produces aqueous product containing measurable and high amounts of carbon (typically greater than 0.3 wt %), and presence of any carbon in the aqueous phase indicates complete hydrodeoxygenation of the biomass.

The yield of C4+ hydrocarbons was only 0.3% of the feedstock weight on a moisture and ash-free basis. The analysis of the gas phase showed C1-C3 hydrocarbons to be the most dominant product, with a yield of 54.7% of the feedstock weight on a moisture and ash-free basis. Of the C1-C3 hydrocarbons, methane was present in the highest amount at 94.3 wt % of C1-C3 hydrocarbons. Thus, the yield of methane expressed as a weight percent of the feedstock weight on moisture and ash-free basis was 51.6 wt %. This yield of methane is the gross yield, assuming the hydrogen needed to run the process can be supplied externally. If some of the light hydrocarbon gases are used to reform the light hydrocarbon gases to produce hydrogen and make the process hydrogen self-sufficient, the amount of methane available will be lowered. It is estimated that in a self-sufficient process, about the yield of exportable methane will be about 20% of the feedstock weight on a moisture and ash-free basis (approximately 0.28 m³ STP methane per kg feedstock processed). The yield of biomethane using this invention from hard, woody biomass is thus comparable to yields actually obtained by anaerobic digestion of much simpler starch or carbohydrate based feedstocks.

The yield structure of the other products is mentioned in Table 1.

TABLE 1

| Feedstock Details | | Yield Details | |
|---|---|---|---|
| Total weight of feedstock processed, g | 251.5 | C4+ Hydrocarbon Yield (wt %, MAF) | 0.30 |
| Duration of feedstock processing, min | 114 | C1-C3 Hydrocarbon Yield (wt %, MAF) | 54.7 |
| Feedstock Analysis | | CO Yield (wt %, MAF) | 0 |
| Moisture, wt %[1] | 2.33 | $CO_2$ Yield (wt %, MAF) | 0 |
| Ash, wt % (dry basis)[2] | 0.33 | Char & Ash Yield (wt %, MAF) | 4.2 |

TABLE 1-continued

| Elemental Analysis (MAF Basis)[3] | | Water Yield (wt %, MAF) | 50.1 |
|---|---|---|---|
| Carbon, wt % | 47.2 | Hydrogen added (wt %, MAF) | 12.85 |
| Hydrogen, wt % | 6.5 | C1-C3 Gas Composition | |
| Oxygen, wt % | 46.2 | Methane wt % | 94.3 |
| Sulfur, wt % | 0.030 | Ethane wt % | 4.8 |
| Nitrogen, wt % | 0.027 | Propane wt % | 0.9 |
| | | Water Analysis | |
| | | pH | 9.7 |
| | | Density (g/mL, at 15° C.) | 0.9984 |
| | | Sulfur Content (ppmw) | 47 |
| | | Nitrogen Content (ppmw) | 1775 |
| | | Carbon Content (wt %) | 0.00 |

Notes:
[1]Moisture content is estimated from weight loss of the sample after drying at 103 ± 2° C.
[2]Ash content is estimate from the weight loss of the sample after combustion at 575 ± 25° C. and expressed on the basis of the dry weight of the sample
[3]MAF = moisture and ash free basis That which is claimed is:

1. A process for producing methane from a biomass, biomass-containing and/or biomass-derived feedstock comprising:
    a) providing in a hydropyrolysis reactor vessel a hydropyrolysis catalyst composition that comprises one or more active metals supported on an oxide-based support, wherein the one or more active metals consist essentially of cobalt, nickel, or a combination thereof, and wherein the one or more active metals are present in total in an amount in the range of from 2 to 75 wt %, based on the overall weight of the hydropyrolysis catalyst composition;
    b) contacting the feedstock with the hydropyrolysis catalyst composition and molecular hydrogen in the hydropyrolysis reactor vessel at a temperature in the range of from 300 to 600° C. and a pressure in the range of from 0.50 to 7.50 MPa, to produce a first product stream comprising char, catalyst fines and gases comprising hydrogen and hydrocarbons, wherein at least 70 wt % of the hydrocarbons present in the first product stream are methane; and
    c) removing the char and catalyst fines from the first product stream.

2. The process of claim 1 further comprising: subjecting the product of step c) to hydroconversion in a hydroconversion reactor vessel in the presence of one or more hydroconversion catalyst composition at a temperature in the range of from 300 to 600° C. and a pressure in the range of from 0.50 MPa to 7.50 MPa to produce a second product stream.

3. The process of claim 1, wherein the one or more active metals in the hydropyrolysis catalyst composition are present in total in an amount in the range of from 2 to 30 wt % based on the overall weight of the hydropyrolysis catalyst composition.

4. The process of claim 1, wherein the one or more active metals in the hydropyrolysis catalyst composition are present in total in an amount in the range of from 5 to 20 wt % based on the overall weight of the hydropyrolysis catalyst composition.

5. The process of claim 2, wherein the hydroconversion catalyst composition comprises one or more active metals supported on an oxide-based support, wherein the one or more active metals consist essentially of cobalt, nickel, or a combination thereof and wherein the one or more active metals are present in total in an amount in the range of from 2 to 75 wt % based on the overall weight of the hydroconversion catalyst composition.

6. The process of claim 1, wherein at least 80 wt % of the hydrocarbons present in the first product stream are methane.

7. The process of claim 1, wherein at least 90 wt % of the hydrocarbons present in the first product stream are methane.

8. The process of claim 1, wherein the first product stream is subjected to cooling and separated from any condensed liquid thus formed, to produce a gaseous stream that is free of said condensed liquid.

9. The process of claim 8, wherein the gaseous stream is subjected to a hydrogen separation step in order to remove hydrogen and to provide a methane stream.

10. The process of claim 9, wherein a portion of the methane stream is subjected to steam reforming in order to provide at least a portion of the molecular hydrogen required by the process in step b).

11. The process of claim 1, wherein the one or more active metals in the hydropyrolysis catalyst composition consist essentially of cobalt.

12. The process of claim 1, wherein the one or more active metals in the hydropyrolysis catalyst composition consist essentially of nickel.

13. A process for producing methane from a biomass, biomass-containing and/or biomass-derived feedstock comprising:
  a) providing in a hydropyrolysis reactor vessel a hydropyrolysis catalyst composition that comprises one or more active metals supported on an oxide-based support, wherein the one or more active metals consist essentially of cobalt, nickel, or a combination thereof, and wherein the one or more active metals are present in total in an amount in the range of from 2 to 75 wt %, based on the overall weight of the hydropyrolysis catalyst composition;
  b) contacting the feedstock with the hydropyrolysis catalyst composition and molecular hydrogen in the hydropyrolysis reactor vessel at a temperature in the range of from 300 to 600° C. and a pressure in the range of from 0.50 to 7.50 MPa, to produce a first product stream comprising char, catalyst fines and gases comprising hydrogen and hydrocarbons, wherein at least 70 wt % of the hydrocarbons present in the first product stream are methane;
  c) removing the char and catalyst fines from the first product stream;
  d) subjecting the product of step c) to hydroconversion in a hydroconversion reactor vessel in the presence of one or more hydroconversion catalyst composition at a temperature in the range of from 300 to 600° C. and a pressure in the range of from 0.50 MPa to 7.50 MPa to produce a second product stream; and
  e) subjecting the second product stream to cooling and separating any condensed liquid thus formed, to produce a gaseous stream that is free of said condensed liquid.

14. The process of claim 13, wherein the gaseous stream is subjected to a hydrogen separation step in order to remove hydrogen and to provide a methane stream.

15. The process of claim 14, wherein a portion of the methane stream is subjected to steam reforming in order to provide at least a portion of the molecular hydrogen required by the process in step b).

16. The process of claim 13, wherein at least 80 wt % of the hydrocarbons present in the first product stream are methane.

17. The process of claim 13, wherein at least 90 wt % of the hydrocarbons present in the first product stream are methane.

18. The process of claim 13, wherein the one or more active metals in the hydropyrolysis catalyst composition are present in total in an amount in the range of from 5 to 20 wt % based on the overall weight of the hydropyrolysis catalyst composition.

19. The process of claim 18, wherein the one or more active metals in the hydropyrolysis catalyst composition consist essentially of cobalt.

20. The process of claim 18, wherein the one or more active metals in the hydropyrolysis catalyst composition consist essentially of nickel.

* * * * *